United States Patent
Odell

(10) Patent No.: US 7,272,557 B2
(45) Date of Patent: Sep. 18, 2007

(54) METHOD AND APPARATUS FOR QUANTIZING MODEL PARAMETERS

(75) Inventor: Julian J. Odell, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 978 days.

(21) Appl. No.: 10/427,215

(22) Filed: May 1, 2003

(65) Prior Publication Data
US 2004/0220804 A1 Nov. 4, 2004

(51) Int. Cl.
*G10L 19/00* (2006.01)

(52) U.S. Cl. .............. 704/230; 704/219; 704/222; 704/224

(58) Field of Classification Search ........... 704/219, 704/229, 230, 227, 222, 208, 224
See application file for complete search history.

(56) References Cited

U.S. PATENT DOCUMENTS

| | | | | |
|---|---|---|---|---|
| 5,754,733 A | * | 5/1998 | Gardner et al. | 704/219 |
| 5,826,224 A | * | 10/1998 | Gerson et al. | 704/222 |
| 6,070,137 A | * | 5/2000 | Bloebaum et al. | 704/227 |
| 6,148,283 A | * | 11/2000 | Das | 704/222 |
| 6,199,037 B1 | * | 3/2001 | Hardwick | 704/208 |
| 6,324,505 B1 | * | 11/2001 | Choy et al. | 704/230 |
| 6,377,916 B1 | * | 4/2002 | Hardwick | 704/208 |
| 6,917,914 B2 | * | 7/2005 | Chamberlain | 704/219 |

OTHER PUBLICATIONS

Young, Steve et al., "THE HTK Book," Version 3.2, (Dec. 1995).

* cited by examiner

*Primary Examiner*—Vijay Chawan
(74) *Attorney, Agent, or Firm*—Theodore M. Magee; Westman, Champlin & Kelly, P.A.

(57) ABSTRACT

A method of quantizing a model parameter includes applying the model parameter to a non-linear scaling function to produce a scaled model parameter and quantizing the scaled model parameter to form a quantized model parameter. In further embodiments, likelihoods for multiple frames of input feature vectors are determined for each retrieval of quantized model parameters from memory.

24 Claims, 8 Drawing Sheets

METHOD AND APPARATUS FOR QUANTIZING MODEL PARAMETERS

BACKGROUND OF THE INVENTION

This application relates to storing model parameters for models that have a large number of parameters. In particular, the application relates to scaling and quantizing model parameters.

Pattern recognition systems are often based on Hidden Markov Models where each model includes three connected model states. During recognition, a frame of an input signal is converted into a multi-dimensional feature vector. This feature vector is then applied to each of the HMM states to determine a likelihood of each state producing the feature vector. In many systems, the likelihood for each state is determined using a mixture of Gaussians. Thus, the feature vector is applied to each Gaussian in the mixture to determine a likelihood and the weighted sum of these likelihoods is the likelihood for the state. In terms of an equation, the likelihood for an HMM state is defined as:

$$b_j(o_i) = \sum_{m=1}^{M} c_{jm} \frac{1}{\sqrt{(2\pi)^n |\Sigma_{jm}|}} e^{-0.5*(o_t-\mu_{jm})' \Sigma_{jm}^{-1} (o_t-\mu_{jm})} \quad \text{EQ. 1}$$

where $b_j(0_t)$ is the state emission likelihood for state j, $c_{jm}$ is the mixture weight for mixture component m, n is the number of dimensions in the input feature vector $0_t$, $\Sigma_{jm}$ is the covariance matrix for the mth mixture component, and $\mu_{jm}$ is the mean for the mth Gaussian.

In many systems, it is assumed that the covariance matrix $\Sigma_{jm}$ is a diagonal matrix. This allows each summand to be calculated as a simple sum in the log domain. This results in:

$$b_j(o_i) = LogSum_m \left( \ln(c_{jm}) - .5 * \ln\left((2\pi)^n \prod_{k=1}^{n} \sigma_{jmk}\right) - 0.5 \sum_{k=1}^{n} (o_{tk} - \mu_{jmk})^2 * (\sigma_{jmk}^{-2}) \right) \quad \text{EQ. 2}$$

where $o_{tk}$ is the kth component of the input feature vector, $\mu_{jmk}$ is the kth component of the mean feature vector, and $\sigma_{jmk}$ is the kth component along the diagonal of the covariance matrix.

To compute the score in Equation 2, a processor would typically pre-compute the first two terms for each mixture component and store these values in memory since they are not dependent on the input feature vector. Input feature vectors would then be received and the last term would be calculated based on those input feature vectors. Note that the summation in the last term requires for each mixture component a separate mean and variance for each dimension of the input feature vector. For each mixture component, with a forty-dimensional feature vector, this summation requires 80 values to be retrieved to recover the means and variances needed to perform the summation.

In the typical implementation, these values are floating point numbers, typically requiring 4 bytes (32 bits) of storage. Thus, for each mixture component in a state, 40×2×4=320 bytes must be retrieved from memory. Even in simple systems, there may well be over 5,000 mixture components across the different possible HMM states. Thus, to process all of the possible states, 5,000×320=1,600,000 bytes of data must be retrieved from memory for every 10 millisecond frame that is processed.

With the increase in processor speed (but without corresponding reductions in the bandwidth and latency of main memory), the time needed to fetch this large amount of data from memory is the factor that limits the evaluation speed of the recognition system.

To overcome this, the prior art has devised systems for quantizing the model parameter values so that they occupy less space. Under one system of the prior art, the 32-bit values for each parameter are converted into an 8-bit index into a code book. While this reduces the total size of the model by allowing similar parameter values to be represented by a single index, it actually increases the number of times the memory must be accessed during the evaluation of the Gaussians because it requires first the retrieval of the 8-bit index and then the retrieval of the actual parameter value using the index.

In an alternative quantization scheme, the 32-bit parameter values are quantized into 8 or 16-bit fixed-point numbers using a linear scaling technique. To form a quantized value, the 32-bit value is multiplied by a scaling factor that is equal to the ratio of the range of quantized values to the range of possible values for the parameter in the 32-bit domain. This scaled value is then added to an offset, which shifts the value so that the breadth of the parameter values across the different mixtures can be represented by values in the quantized domain.

Such linear quantization reduces the model size and the size of each individual parameter thereby reducing the total time required to retrieve the parameters used in the evaluation from memory into the CPU. However, this quantization decreases the accuracy of the system. In particular, because a large number of floating bit values are assigned to a single quantized value, the quantized value is only an approximation for each 32-bit value and the difference between the approximation and the actual 32-bit value constitutes a quantization error that can distort the evaluation process.

Thus, a system is needed that can reduce the time required to retrieve parameters used in the evaluation of a Hidden Markov Model while limiting the introduction of distortion into the evaluation of the model.

SUMMARY OF THE INVENTION

A method of quantizing a model parameter includes applying the model parameter to a non-linear scaling function to produce a scaled model parameter and quantizing the scaled model parameter to form a quantized model parameter. In further embodiments, likelihoods for multiple frames of input feature vectors are determined for each retrieval of quantized model parameters from memory.

DETAILED DESCRIPTION OF ILLUSTRATIVE EMBODIMENTS

Figure 1:
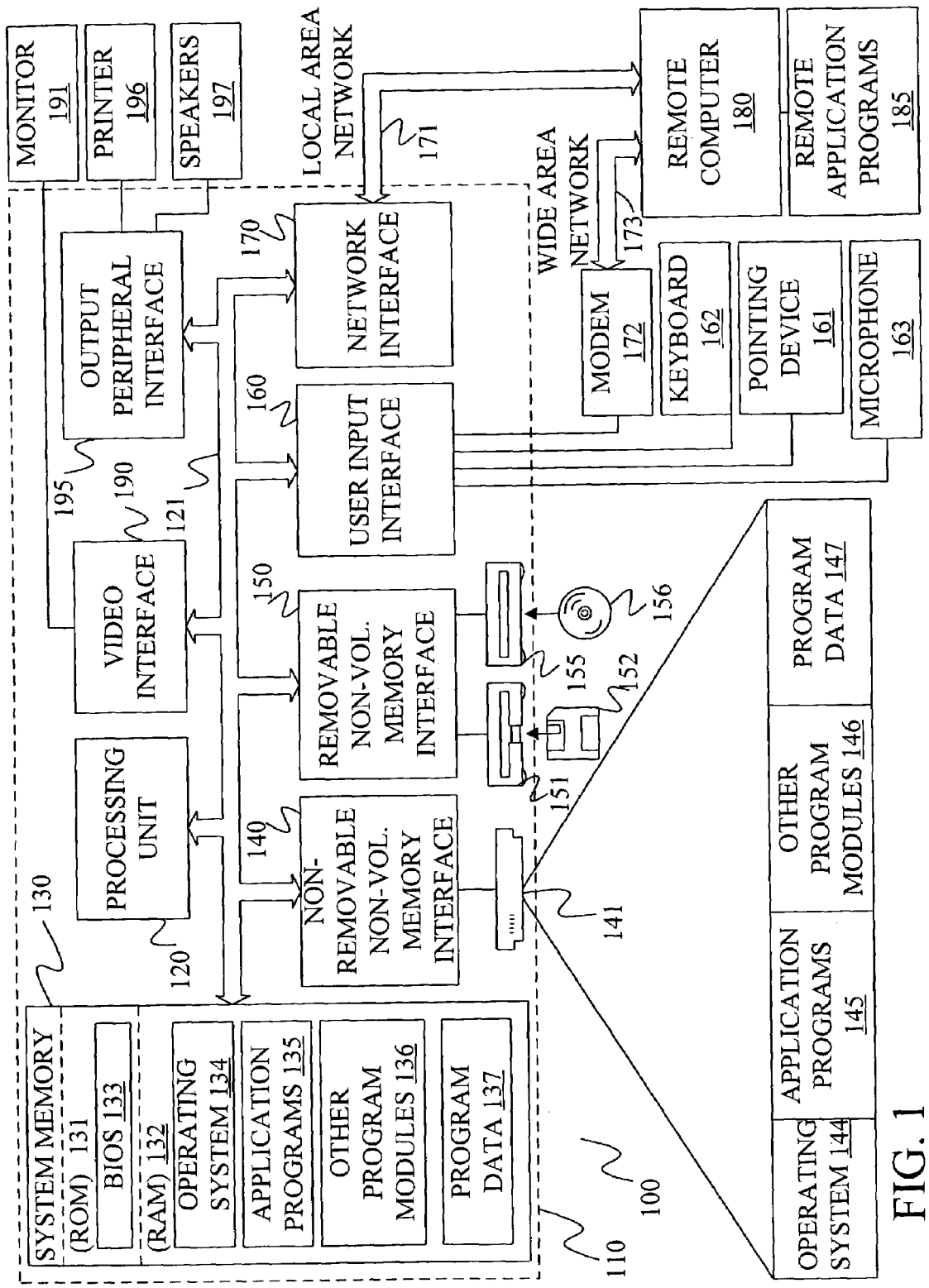
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
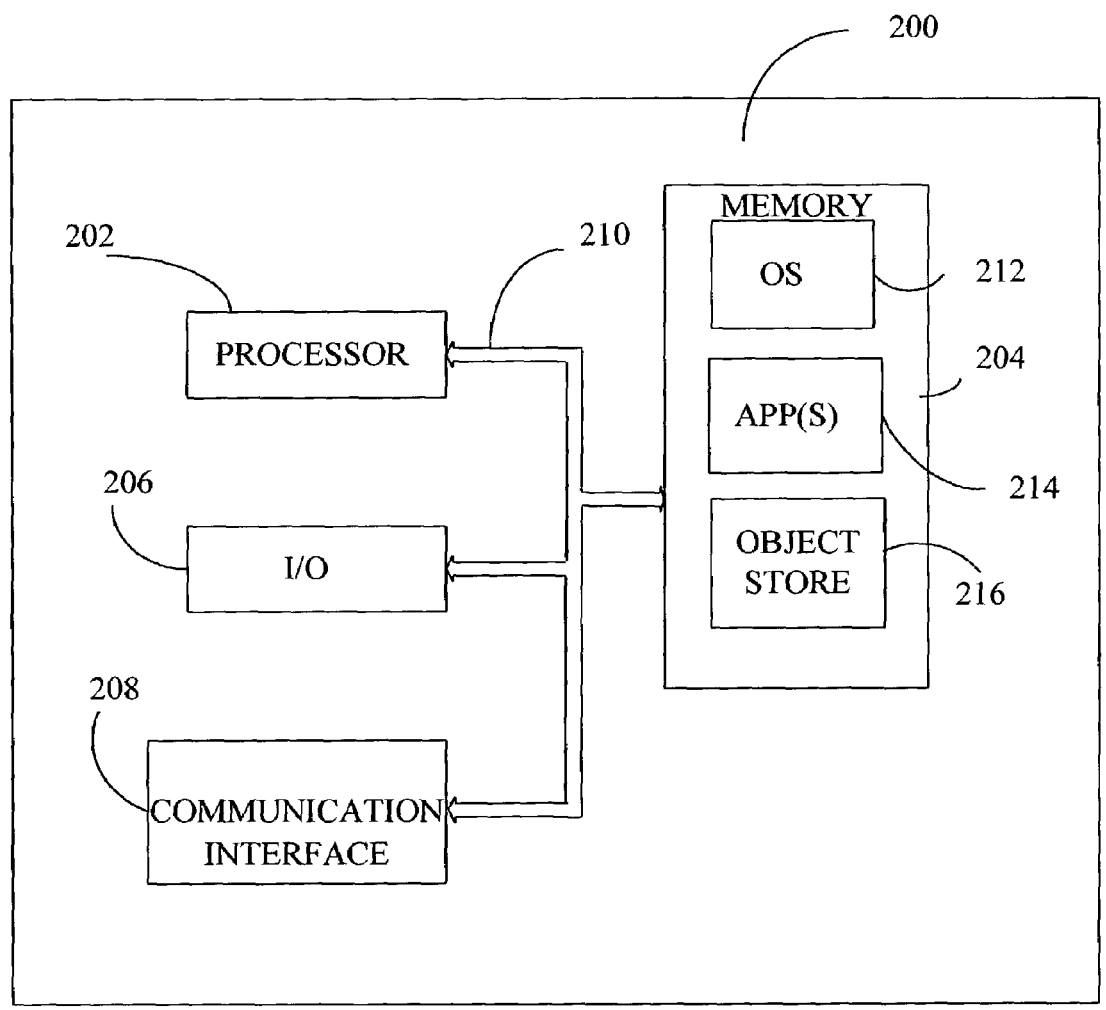
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
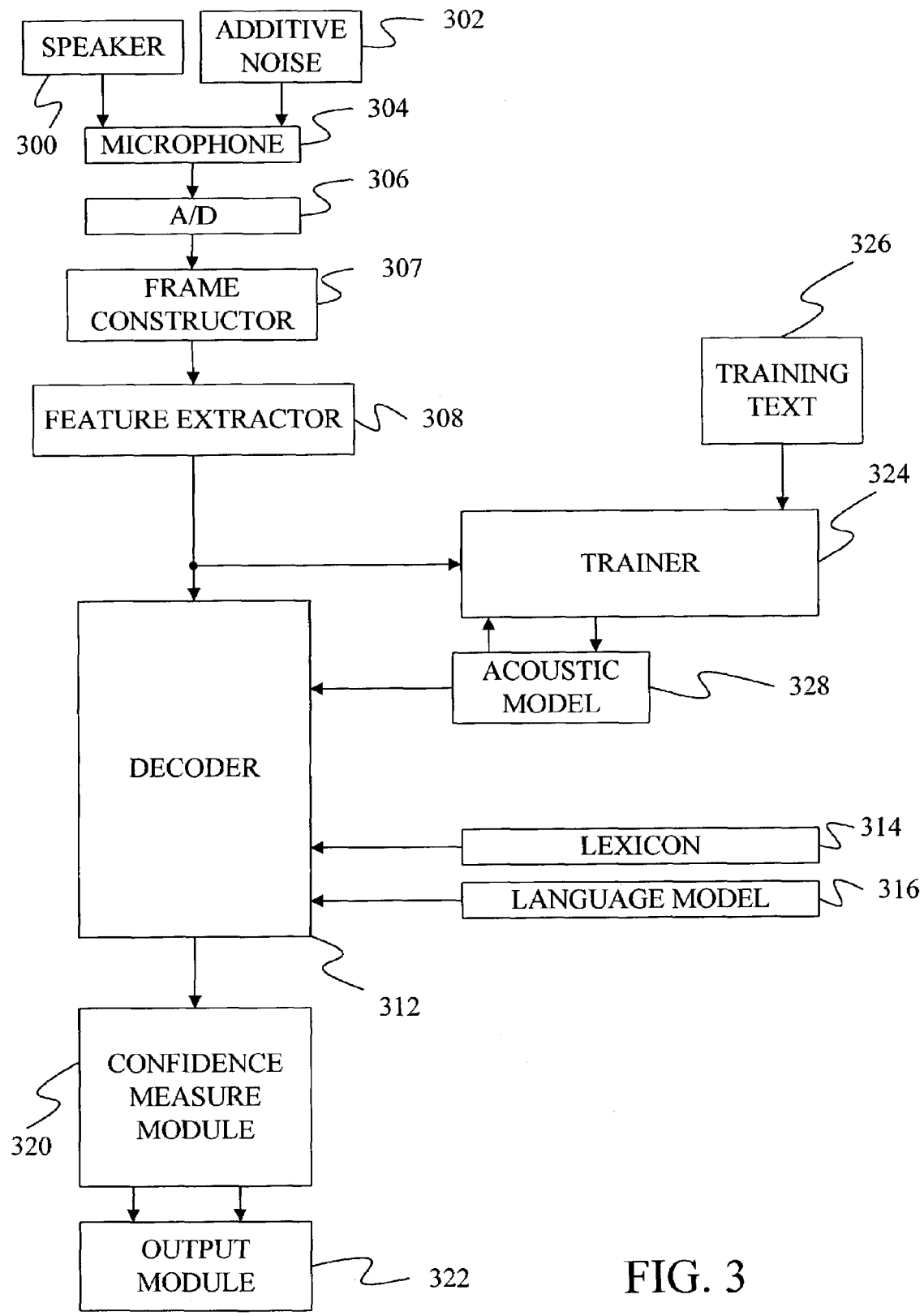
FIG. 3 is a block diagram of a speech recognition system in which embodiments of the present invention may be practiced.

FIG. 3 provides a block diagram of a speech recognition system in which the present invention can be used. In FIG. 3, a speaker 300, either a trainer or a user, speaks into a microphone 304. Microphone 304 also receives additive noise from one or more noise sources 302. The audio signals detected by microphone 304 are converted into electrical signals that are provided to analog-to-digital converter 306.

A-to-D converter 306 converts the analog signal from microphone 304 into a series of digital values. In several embodiments, A-to-D converter 306 samples the analog signal at 16 kHz and 16 bits per sample, thereby creating 32 kilobytes of speech data per second. These digital values are provided to a frame constructor 307, which, in one embodiment, groups the values into 25 millisecond frames that start 10 milliseconds apart.

The frames of data created by frame constructor 307 are provided to feature extractor 308, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The series of feature vectors is provided to a trainer 324, which uses the feature vectors and a training text 326 to train an acoustic model 328, if the input signal is a training signal. For example, an EM training algorithm may be used to train the model parameters.

Once acoustic model 328 has been trained, an input speech signal is converted into a stream of observation feature vectors. Decoder 312 then identifies a most likely sequence of words based on the stream of feature vectors, a lexicon 314, a language model 316, and acoustic model 328. Under one embodiment, lexicon 314 defines a finite state network that is traversed by decoder 312 to identify a word from a sequence of feature vectors.

The most probable sequence of hypothesis words is provided to a confidence measure module 320. Confidence measure module 320 identifies which words are most likely to have been improperly identified by the speech recognizer, based in part on a secondary acoustic model (not shown). Confidence measure module 320 then provides the sequence of hypothesis words to an output module 322 along with identifiers indicating which words may have been improperly identified. Those skilled in the art will recognize that confidence measure module 320 is not necessary for the practice of the present invention.

Acoustic model 328 of FIG. 3 consists of a large number of model parameters (often in excess of one million parameters) that must be stored in memory.

Figure 4:
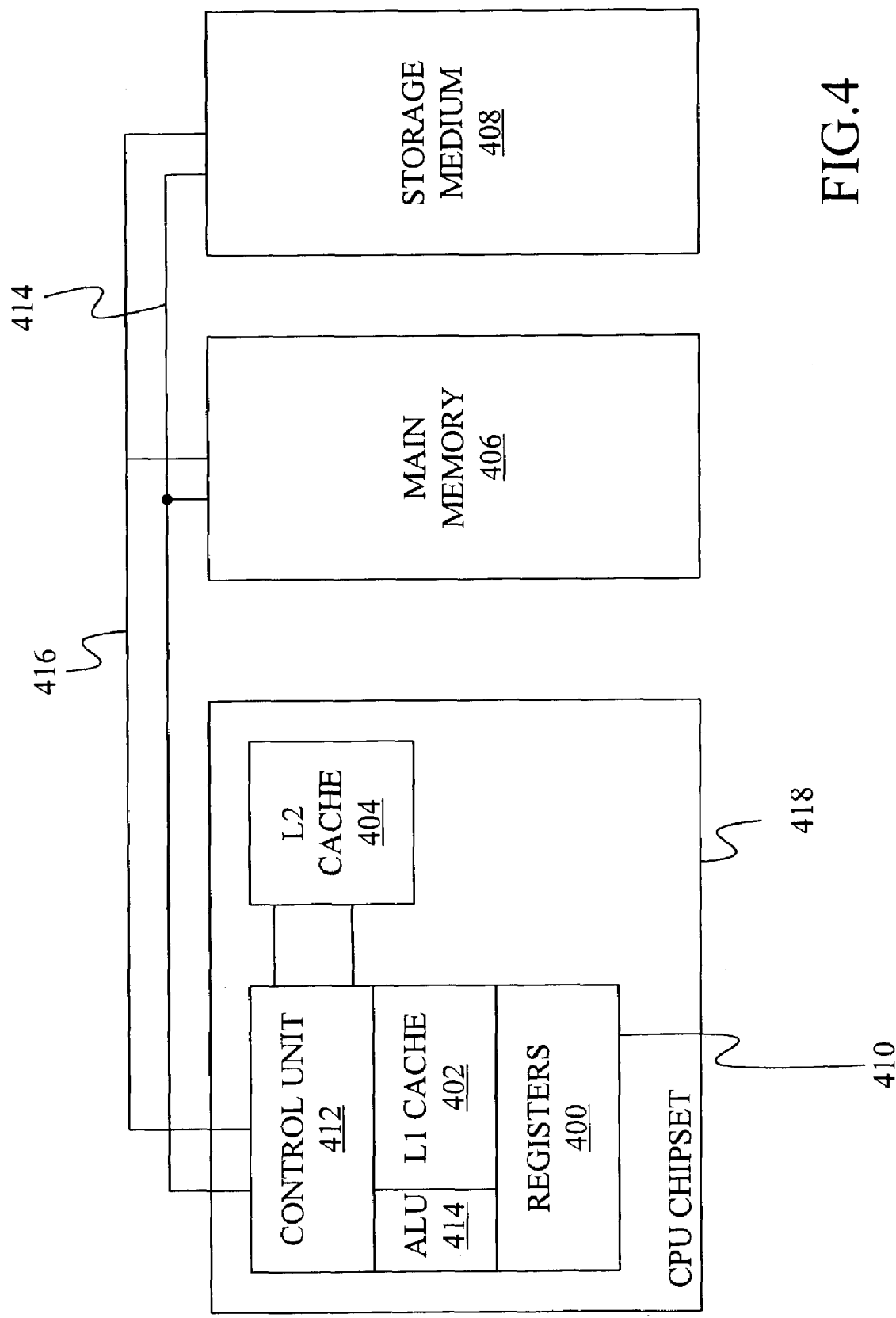
FIG. 4 is a block diagram of the memory layout of a microprocessor based computing device.

FIG. 4 provides a block diagram of the memory layout in a computing device. In general, there are four levels of memory storage in a microprocessor based device. These levels of memory include a set of registers 400, a Level 1 or primary cache 402, a Level 2 or secondary cache 404, a main random access memory 406 and a storage medium 408. Registers 400 and L1 cache 402 are located on central processing unit (CPU) chip 410, which also contains the central processing unit's control unit 412 and arithmetic logic unit 414. Level 2 cache 404 is located in the same chip set 418 as CPU chip 410, but may not be located on CPU chip 410. Main random access memory 406 is typically attached to the same motherboard as CPU chip set 418 and is connected to the chip set by an address bus 414 and a data bus 416. Storage medium 408 is connected to chip set 412 by address bus 414 and data bus 416, and is typically located apart from the motherboard.

Control unit 412 is responsible for retrieving and decoding instructions that are executed by arithmetic logic unit 414. Control unit 412 also loads the data needed by an instruction into registers 400 if the data has not already been loaded. For data that is not already present in register 400, control unit 412 requests the needed data from the location where it is stored and stores the data in registers 400. In general, as the distance between control unit 412 and the location of the data increases, the period of time required to retrieve the data also increases. Table 1 below describes the typical size, bandwidth and latency associated with each of the memory locations.

TABLE 1

| | Registers | L1 cache | L2 cache | Main memory |
|---|---|---|---|---|
| Size (Bytes) | 64-256 | 8-64K | 0-512K | 32M-4G |
| Bandwidth (Bytes per CPU clock cycle) | 4-32 | 4-32 | 0-32 | 0.5-1 |
| Latency (CPU clock cycles) | <1 | 1-3 | 5-20 | 40-200 |

As can be seen in Table 1, registers 400 have a large bandwidth and a low latency, but have a very limited size. The Level 1 cache has a slightly larger latency period than the registers but has a significantly larger capacity than the registers. The Level 2 cache is much larger than the Level 1 cache, but has a much longer latency period (if the Level 2 cache is not located on the same chip as the control unit the latency can be even higher). Lastly, the main memory has a huge capacity, but also has a very limited bandwidth of 0.5-1 bytes per cycle and a large latency of 40-200 CPU clock cycles.

As can be seen from Table 1, it would be desirable to make the acoustic model parameters as small as possible to either allow them to be frequently available from the Level 1 cache or the Level 2 cache, or to decrease the amount of time needed to load the parameters from the main memory.

As discussed in the background section, the prior art attempted to reduce the size of the model parameters using linear scaling quantization. In linear scaling quantization, a 4 byte floating point number is multiplied by a scaling factor and the product is added to an offset value. The resulting sum is then quantized. The scaling is done to adjust the range of the 4 byte floating point numbers so that the range of the scaled values matches the range of the available quantization values. The range of values for a model parameter is typically smaller than the range of quantization values such that the scaling factor is larger than 1.

The offset value is used to shift the scaled values so that the range of scaled values matches the range of quantized values. The scaled and offset value is then quantized by assigning the scaled 4 byte floating bit value to an 8-bit byte. Under the prior art, this quantization was done using constant step functions as shown in the quantization diagram of FIG. 5.

Figure 5:
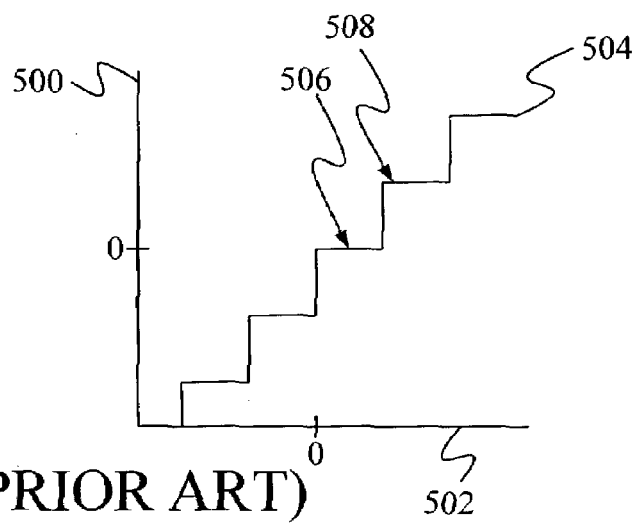
FIG. 5 is a graph showing linear quantization of the prior art.

In FIG. 5, the 8-bit quantized values are shown along vertical axis 500 and the 4 byte scaled floating-point values are shown along horizontal axis 502. Graph 504 represents the step function used to quantize the scaled values into quantized values. In FIG. 5, the parameter values have been offset so that the center point of the scaled values is equal to 0 to match the center point of the available quantized values.

The length of the horizontal components of graph 504, such as components 506 and 508, represent the maximum quantization error associated with the quantization scheme of FIG. 5. The longer the length of the horizontal components, the more error that may be introduced by the quantization. In the quantization of the prior art shown in FIG. 5, each of the horizontal portions of graph 504 are identical meaning that the quantization error is constant across all of the quantized values.

The present inventors have discovered that the quantization scheme of FIG. 5 is less than ideal. In particular, the present inventors have found that if the values being quantized are not distributed uniformly over all possible values, the quantization scheme of FIG. 5 does not minimize the quantization error. Under the present invention, it has been found that if values are distributed in a non-uniform manner, the quantization should be performed in a non-linear manner so that the quantization error is minimized across the values that are produced most often for the parameters.

Figure 6:
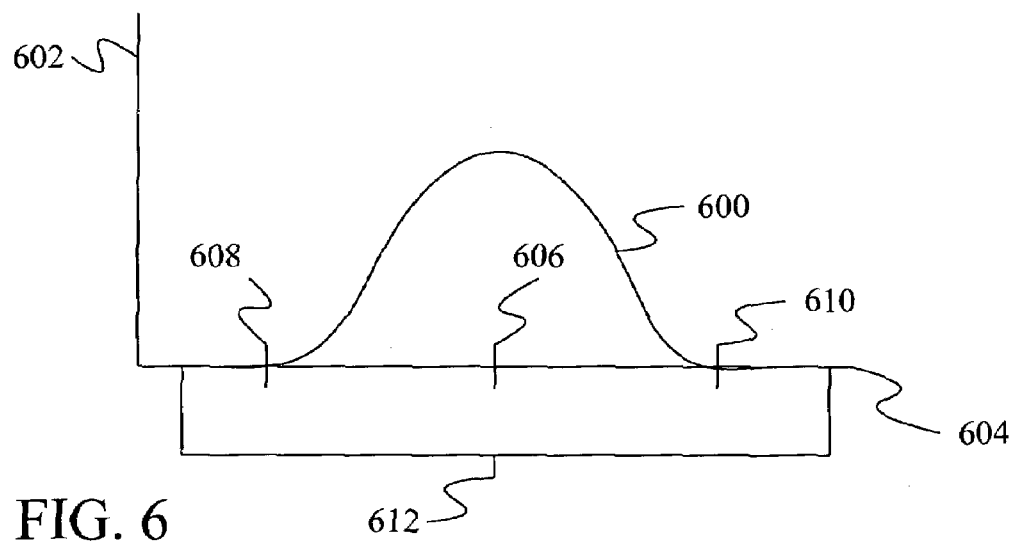
FIG. 6 is a distribution of mean values for a vector component K across a set of mixture components.

For example, FIG. 6 shows a possible distribution of model parameter values produced for a single vector component and HMM state. The value of the means is shown along horizontal axis 604 and the number of times a value for a parameter was observed is shown along vertical axis 602. As can be seen in FIG. 6, the parameter values have a distribution 600 that is bell-shaped with an average value (mean, median and mode) 606. Because of this bell-shape, a majority of the parameter values are located around average 606. In other distributions, a majority of the parameters may be grouped at different positions in the distribution than at the average.

Figure 7:
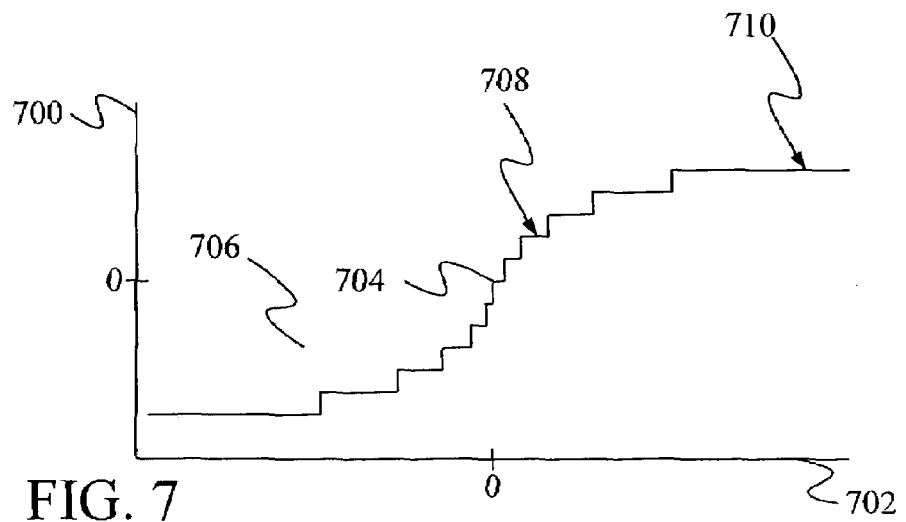
FIG. 7 is a graph showing non-linear quantization under one embodiment of the present invention.

To take advantage of the non-uniform distribution, the present invention uses non-linear scaling to alter the quantization such that there is a smaller amount of quantization error where the majority of the parameter values are located (for the example of FIG. 6, around average 606) while there is a larger quantization error for the smaller number of values found elsewhere in the distribution (for the example of FIG. 6, along the edges the distribution 600). Under one embodiment, this non-linear scaling involves taking the square root of the magnitude of the linearly scaled values and quantizing the square root together with the sign of the value instead of the linearly scaled values. FIG. 7 provides a graph of this quantization with the quantized values shown on vertical axis 700 and the linearly scaled values shown along horizontal axis 702.

In FIG. 7, parameter values are first linearly scaled by multiplying them by a scaling value to convert the range of the scaled parameter values to the range of the quantized values. The scaled values are then offset such that the average parameter value has a linear scaled value of 0, which is located at point 704 of FIG. 7. After the linear scaling, the square root of the magnitude of the linearly scaled values is taken and the square root value is quantized and the sign re-encoded to identify a quantization value. The steps of taking the square root and quantizing the square root results in a non-constant step function graph 706.

As with the quantization function of FIG. 5, the length of the horizontal portions of graph 706, such as portions 708 and 710, indicate the maximum amount of quantization error associated with this quantization scheme. As can be seen in FIG. 7, the maximum quantization error is not constant. Near the average parameter value, indicated by point 704, the quantization error is much smaller than at the values located away from the average value. For example, the average quantization error associated with section 708 is much smaller than the quantization error associated with section 710.

By assigning a smaller amount of quantization error to a majority of the parameter values, the present invention achieves an overall reduction in the amount of quantization error in the models. As a result, models that use the non-linear quantization of the present invention should have fewer errors.

Note that the present invention is not limited to using a square root function as the non-linear quantization function and other non-linear functions may be used. However, it has been found that more efficient evaluations of Gaussian models can be achieved if the reverse of the selected non-linear function is efficient to calculate. For example, for the square-root function the reverse function, squaring a number, is a computationally efficient operation.

Figure 8:
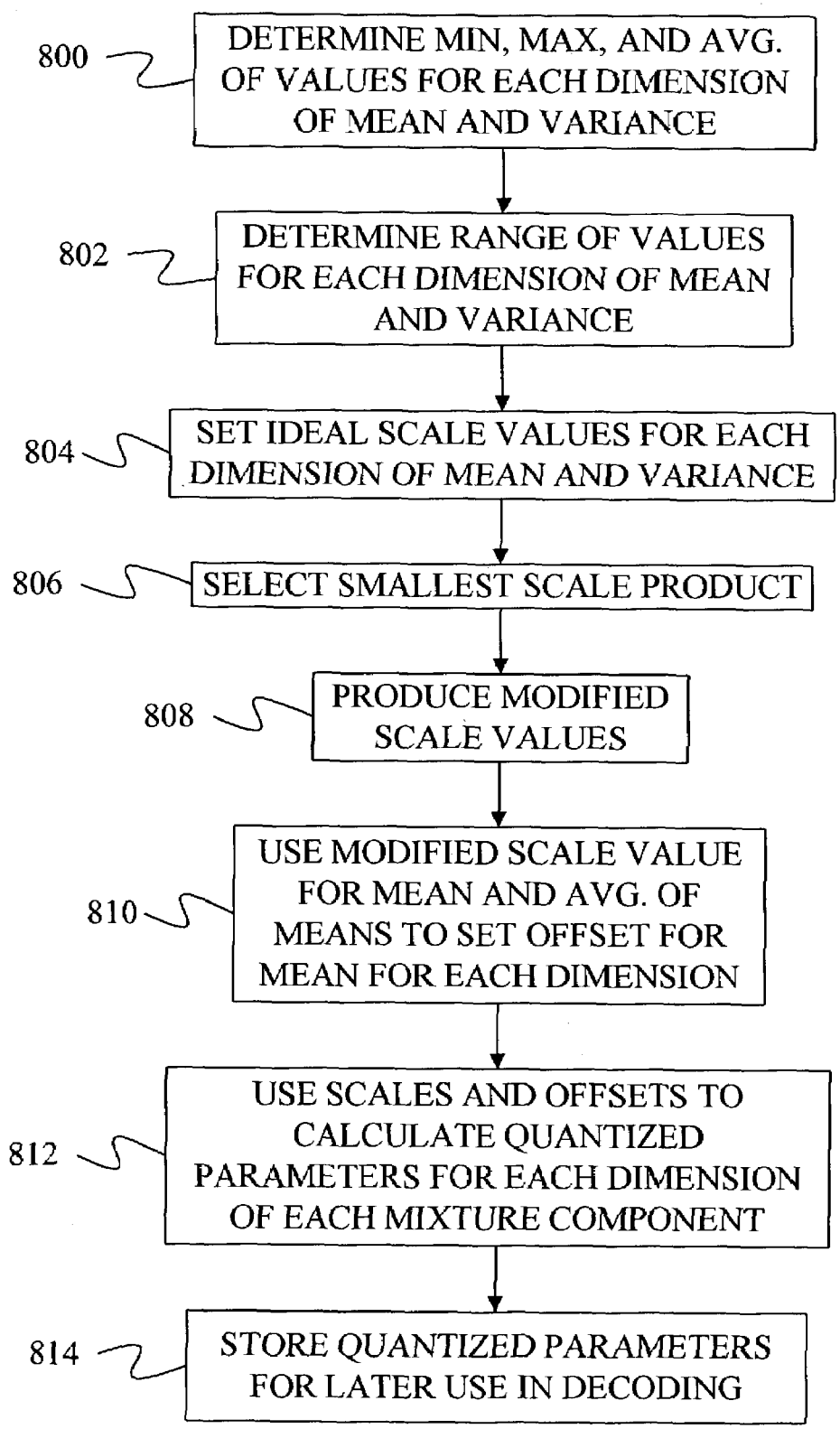
FIG. 8 is a flow diagram for non-linear quantization of parameters under one embodiment of the present invention.

FIG. 8 provides a flow diagram under one embodiment of the present invention for performing non-linear quantization of model parameters used in a mixture of Gaussians Hidden Markov Model.

In step 800, the maximum, minimum and average values for each dimension of the mean and variance is determined using values from each of the mixture components in each of the HMM states. For example, in the distribution of FIG. 6 for a single dimension of the mean, the maximum 610, minimum 608 and the average 606 would be determined using values from each of the mixture components. Under one embodiment, the average is determined by summing the values of a dimension and dividing by the number of values.

At step 802, a range of values is determined for each dimension of the mean and variance. Under one embodiment, this range is determined by subtracting the average value from the maximum value to determine the distance between the maximum value and the average. The minimum value is then subtracted from the average value to determine the distance between the minimum value and the average. The larger of these two values is then multiplied by 2.2 to provide the range for the values. Multiplying by the factor of 2.2 provides a buffer beyond the observed values for the mean and variance. This results in a range that exceeds the maximum and minimum values such as range 612 of FIG. 6.

At step 804, a set of ideal scale values is determined for each dimension of the mean and variance. Under one embodiment, the scale value is the ratio of the range of possible quantized values (256 for an 8-bit quantized value) to the range determined for each dimension of the mean and variance at step 802. At step 806, the scaling value for the mean and the scaling value for the variance of each dimension are multiplied together to provide a scale product for each dimension. The smallest scale product is then selected.

At step 808, the selected scale product is used to modify the ideal scale values of each dimension. This modification is performed according to:

$$scale'_{\mu_k} = scale_{\mu_k} \cdot \sqrt{\frac{\min(scale_\mu \cdot scale_\sigma)}{scale_{\mu_k} \cdot scale_{\sigma_k}}} \quad \text{EQ. 3}$$

$$scale'_{\sigma_k} = scale_{\sigma_k} \cdot \sqrt{\frac{\min(scale_\mu \cdot scale_\sigma)}{scale_{\mu_k} \cdot scale_{\sigma_k}}} \quad \text{EQ. 4}$$

where $scale'_{\mu_k}$ is the modified scale for kth dimension of the mean, $scale_{\mu_k}$ is the ideal scaling factor for kth dimension of the mean, $scale'_{\sigma_k}$ is the modified scaling factor for the kth dimension of the variance, $scale_{\sigma_k}$ is the ideal scaling factor for the kth dimension of variance, and $\min(scale_\mu \cdot scale_\sigma)$ is the minimum scaling product determined in step 806.

At step 810, the modified scaling value for the mean and the average of the means are used to set the offset of the mean. In particular, the offset for the kth dimension is set according to:

$$\text{offset}_k = scale'_{\mu_k} \bar{\mu}_k \quad \text{EQ.5}$$

where $\text{offset}_k$ is the offset associated with the kth dimension of the mean, and $\bar{\mu}_k$ is the average of the kth dimension of the mean across all of the mixture components.

The scale values and offsets determined by Equations 3-5 are then used to calculate quantized parameters for each dimension of each mixture component at step 812. Under one embodiment of the present invention, two quantized parameters are determined for each dimension of each mixture component in each state according to:

$$linear_{jmk} = \mu_{jmk} \sigma^{-1}_{jmk} scale'_{\mu_k} scale'_{\sigma_k} - \text{offset}_k \sigma^{-1}_{jmk} scale'_{\sigma_k} \quad \text{EQ. 6}$$

$$x_{jmk} = \text{sign}[linear_{jmk}] \cdot Q[\sqrt{\text{abs}(linear_{jmk})}] \quad \text{EQ. 7}$$

$$y_{jmk} = Q\lfloor \sigma^{-1}_{jmk} scale_{\sigma_k} \rfloor \quad \text{EQ. 8}$$

where sign[] indicates the sign of the expression within the brackets, $\mu_{jmk}$ is the mean determined for the kth dimension of the mth mixture component in state j, $\sigma_{jmk}^{-1}$ is the variance for the kth dimension of the mth mixture component of state j, abs ( ) indicates the absolute value of the expression within the parentheses, and Q[] indicates the quantization of the expression with in the brackets. Under one embodiment, the quantization function Q[] is performed by selecting only the integer portion of the expression.

Once the quantized parameters have been calculated using Equations 6, 7 and 8 above, the quantized parameters are stored for later use in decoding at step 814.

Once the model parameters have been quantized and stored, the acoustic model may be used in recognition. A method of decoding using these quantized values is shown in the flow diagram of FIG. 9.

Figure 9:
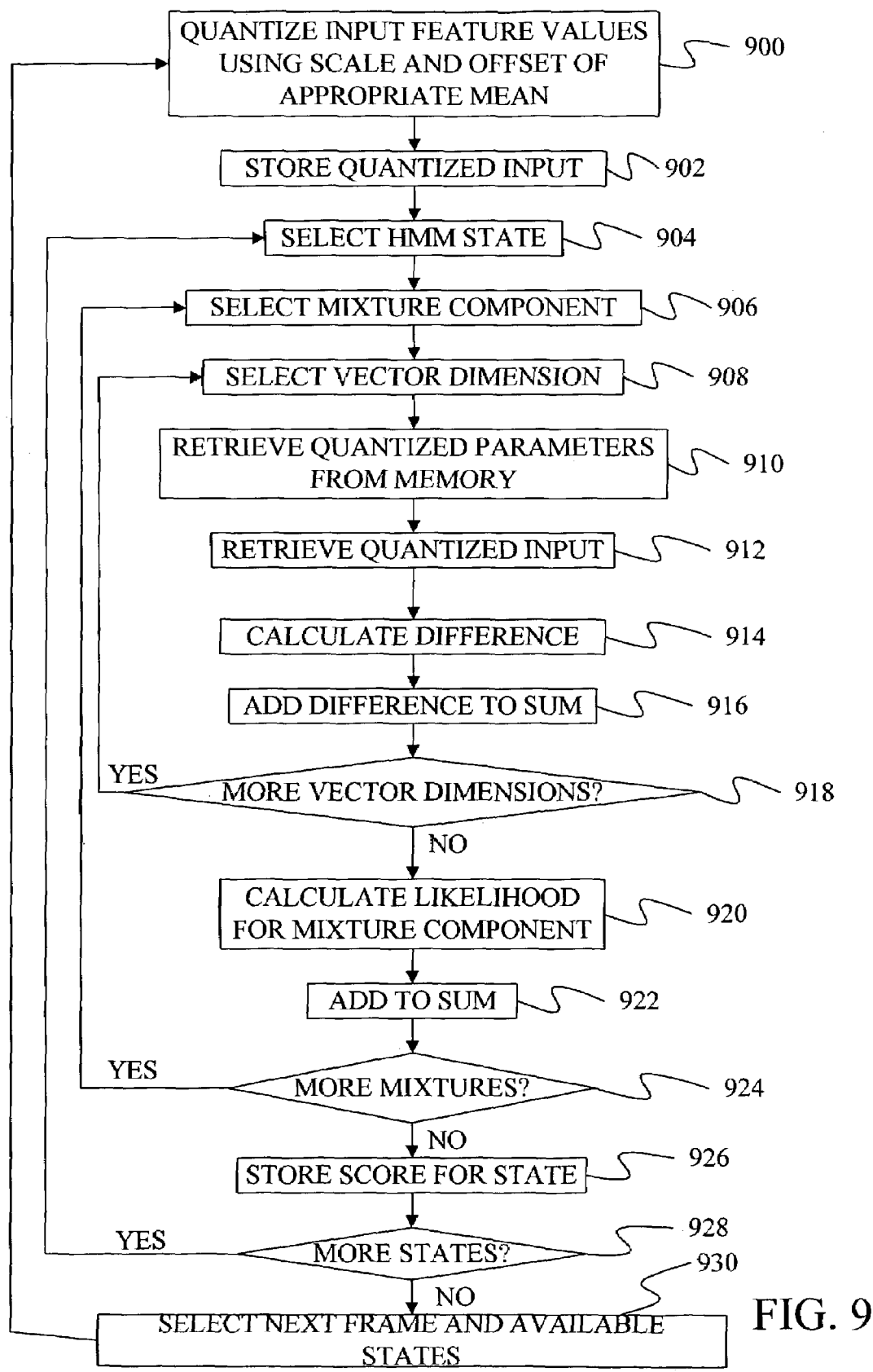
FIG. 9 is a flow diagram for generating a recognition likelihood under one embodiment of the present invention.

In step 900 of FIG. 9, the component values of an input feature vector for a frame are quantized using the scale and offset of the component's mean. In terms of an equation:

$$q_k = Q[o_{tk} \text{scale}'_{\mu_k} - \text{offset}_k] \qquad \text{EQ. 9}$$

where $o_{tk}$ is the kth component value of the input feature vector at time t, and $q_k$ is the quantized version of the observed value for the kth dimension.

The quantized component values are stored in memory. Because they are repeatedly used in the calculations below, they are moved to the L1 cache by the processor. Thus, these quantized values are easy to access during the calculation.

At step 904, a Hidden Markov Model state is selected for evaluation of the likelihood that the state would generate the input feature vector. Under one embodiment, this likelihood is calculated according to:

$$b_j(o_t) = LogSum \qquad \text{EQ. 10}$$

$$\left\{ \begin{array}{l} \ln(c_{jm}) - .5 * \left( \ln\left( (2\pi)^n \left| \sum_{jm} \right| \right) \right) + \\ \dfrac{.5}{[\min(scale_\mu \cdot scale_\sigma)]^2} \sum_{k=1}^{n} ((q_k * y_{jmk}) - (x_{jmk} \text{abs}(x_{jmk})))^2 \end{array} \right\}$$

The calculation of Equation 10 is performed using steps 906, 908, 910, 912, 914, 916, 918, 920, 922, 924 and 926 below.

In steps 906 and 908, a mixture component and a vector dimension are selected for the state selected in step 904. Based on the state, mixture component and dimension (jmk) a pair of quantized parameters are retrieved from memory at step 910. For small models, the quantized parameters may be present in the L2 cache. However, in most recognition models, the quantized parameters will be retrieved from main memory.

At step 912, the quantized input for the selected dimension is retrieved, typically from the L1 cache. The retrieved input and quantized parameters are then used to calculate the difference found in the summation of Equation 10. In particular, the following calculation is performed:

$$((q_k * Y_{jmk}) - (x_{jmk} abs(x_{jmk})))^2 \qquad \text{EQ. 11}$$

At step 916, the squared difference calculated in step 914 is added to a running sum being maintained for the dimensions of the vector, which is indicated by the summation over k in Equation 10.

At step 918, the process determines if there are additional vector dimensions to be processed for the summation of Equation 10. If there are additional dimensions, the process returns to step 908 where a new dimension is selected and steps 910, 912, 914 and 916 are repeated for the new dimension.

When there are no more vector dimensions to be processed at step 918, the likelihood for the selected mixture component is calculated at step 920. To calculate the likelihood for the mixture component, the sum across the vector dimensions is multiplied by a scaling factor that is equal to 0.5 over the square of the minimum scaling product determined in step 806. This multiplication removes the effects of the scaling from the calculations. Note that by modifying the scaling factors using Equations 3 and 4 above, the present invention made it possible to wait to remove the scaling factors until after the summation is performed because the product of the modified scaling factors is the same for every summand in the summation. This reduces the number of computations that need to be performed since the multiplication for the sealing adjustment does not have to be performed for each summand but instead can be performed once for the sum.

After the sum has been adjusted by the scaling factor, the scaled sum is added to the two other terms in Equation 10. In one embodiment of the present invention, the two other terms in Equation 10 are stored as a single value in memory. This reduces the number of values that must be accessed and the number of computations that must be performed to determine the likelihood for the mixture component.

After the likelihood for the mixture component has been calculated, it is added to the summation for the state, which is represented by the term "LogSum" in Equation 10. This addition is performed at step 922.

At step 924, the method determines if there are more mixture components to be evaluated for this state. If there are more mixture components, the process returns to step 906 where the next mixture component is selected. The steps of calculating a score for that mixture component are then repeated.

When there are no more mixture components at step 924, the score for the state has been calculated and is stored at step 926. At step 928, the method determines if there are more states to be evaluated. If there are more states, the next state is selected and the steps are repeated to calculate the likelihood score for the new state.

When all of the states have been processed at step 928, the next frame of input is selected and the available states for that frame are identified at step 930. Under most embodiments, a pruning algorithm is used to identify the states needed for the next frame. This pruning algorithm removes states from consideration based on the scores for the states in the previous frame and the allowed sequences of states set by lexicon 314 and language model 316 of FIG. 3.

Through the quantization techniques described above, the present invention is able to reduce the number of bytes that must be retrieved to determine the state likelihoods by a factor of 4. A further improvement can be achieved under a further embodiment of the present invention in which multiple input feature vectors are evaluated for each retrieval of the quantized parameters. Under one particular embodiment, four frames of feature vectors are evaluated for each set of retrieved quantized parameters. As the feature vectors are normally available from the L1 cache it is much faster to retrieve multiple feature vectors than multiple means and variances.

During normal speech recognition decoding, pruning is utilized to reduce the number of states that need to be evaluated. This pruning is typically based in part on the probabilities of states in the preceding frame. Because of this pruning, evaluating multiple frames before the pruning has taken place can result in inefficiencies because some of the states will be pruned and therefore will not need to be evaluated.

The present inventors have found that computing four frames for each state balances the efficiency of retrieving the quantized values with the efficiency of not evaluating frames that will be pruned. For example, the present inventors have found that using the quantization techniques of the present invention, computing a single frame for a state requires 5 units of processing whereas computing four frames for a state requires 9 units. However, given the possibility of pruning, on average, only three of the four frames will survive pruning and require likelihood scores. Thus, by evaluating four frames at a time, an effective evaluation rate of 3 units per frame (9/3 effective frames) can be achieved. Since this is less than the 5 units per frame required when computing a single frame at a time, it is more efficient to evaluate four frames for each retrieval of the model parameters.

Figure 10:
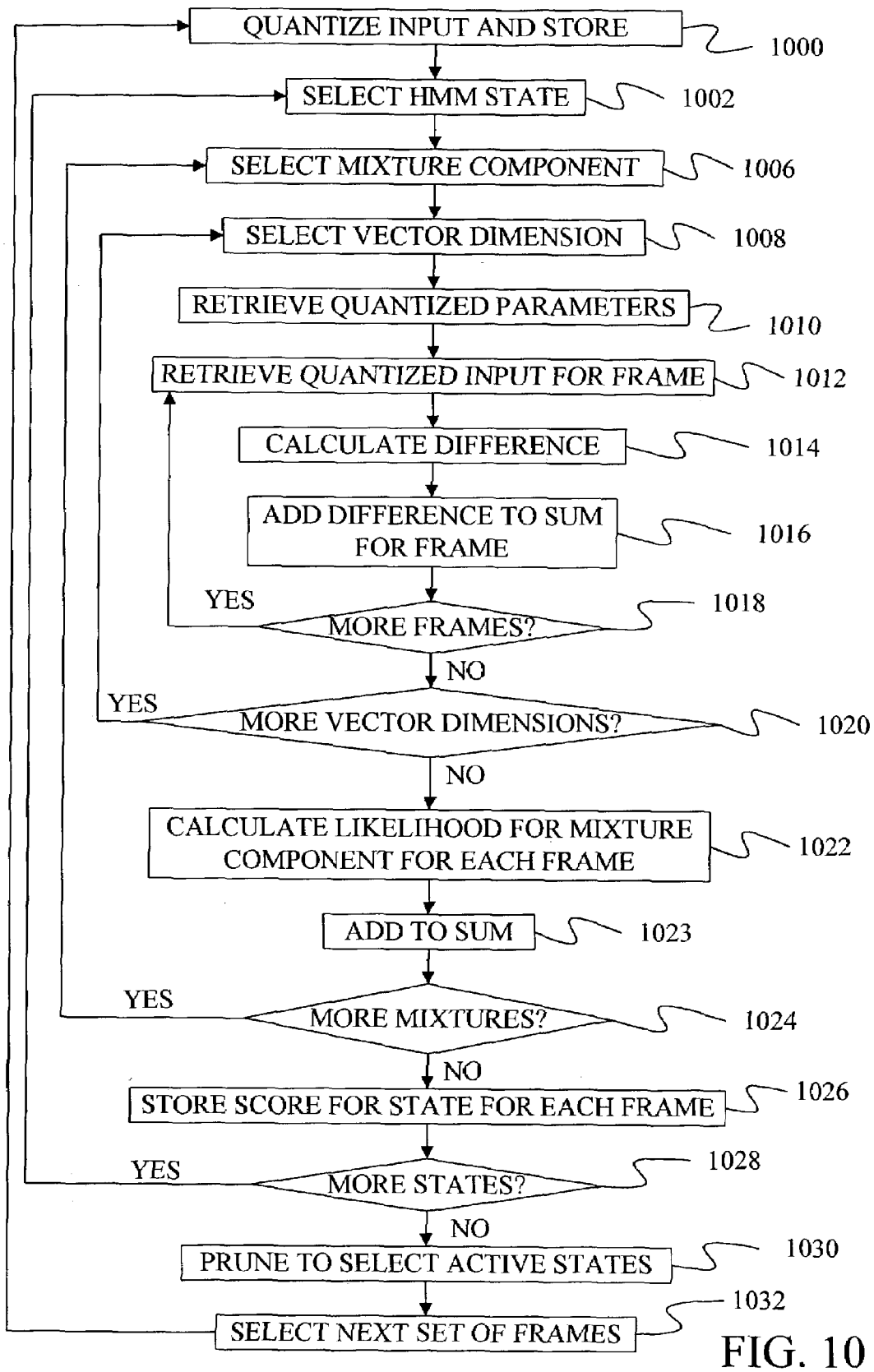
FIG. 10 is a flow diagram for generating a recognition likelihood under a second embodiment of the present invention.

FIG. 10 provides a flow diagram of one method of the present invention for evaluating multiple frames for each retrieval of a set of model parameters.

In step 1000, the input feature vectors for the frames are quantized and stored. For example, if four frames will be processed for each set of quantized parameters, four feature vectors would be quantized and stored. At steps 1002, 1004 and 1006 a state, a mixture component within the state and a vector dimension are selected. At step 1010, the quantized parameters for the combination of the state, mixture component and vector dimension is retrieved from memory. At step 1012, a quantized input for a current frame is selected. This input is used with the quantized parameters retrieved at step 1010 to calculate a difference value in a manner similar to that discussed above for step 914. At step 1016, this difference value is added to the sum for the frame.

At step 1018, the method determines if there are more frames to be processed for the current set of quantized parameters. If there are more frames to be processed, the method returns to step 1012 where the quantized input for the next frame is selected. The new quantized input is used to calculate a difference value at step 1014 and this difference value is added to the sum for the new frame at step 1016. Steps 1012, 1014, 1016 and 1018 are repeated for each frame that is to be evaluated for the single retrieval of the quantized parameters.

When all the frames have been processed at step 1018, the process continues at step 1020 where a determination is made as to whether there are more vector dimensions to be processed. If there are more vector dimensions, the process returns to step 1008 to select the next vector dimension. The quantized parameters associated with the newly selected vector dimension are then retrieved at step 1010. Steps 1012, 1014, 1016 and 1018 are then performed for the newly selected quantized parameters across the same frames that had been used for the previous set of quantized parameters.

After each of the vector dimensions has been processed at step 1020, a mixture component likelihood is calculated for each of the frames that were evaluated in steps 1012, 1014, 1016 and 1018. This involves using the sum determined at step 1016 for each frame in a calculation similar to that described above for step 920 of FIG. 9.

After the mixture component likelihoods have been determined for each of the frames at step 1022, the method determines if there are additional mixture components. If there are additional mixture components, the next mixture component is selected at step 1006 and steps 1008, 1010, 1012, 1014, 1016, 1018, 1020 and 1022 are repeated using the same frames that were used for the other mixture components. When there are no more mixture components at step 1024, a state score is calculated for each frame at step 1026 by performing a calculation similar to that described above for state 926 in FIG. 9.

At step 1028, the method determines if there are additional states to be processed for this set of frames. If there are more states to be processed, the method returns to step 1002 and the next state is selected. If there are no more states to be processed, a pruning step 1030 is performed for the next set of frames, thereby limiting the states that will be considered for the next set of frames. Such pruning can be performed based on the scores for the states in the current set of frames and a language model and/or a lexicon. After the pruning step, the next set of frames is selected at step 1032 and the process returns to step 1000 where the input for the next set of frames is quantized. The process of FIG. 10 is repeated until all of the input frames have been processed.

Although the present invention has been described with reference to particular embodiments, workers skilled in the art will recognize that changes may be made in form and detail without departing from the spirit and scope of the invention.

What is claimed is:

1. A method of quantizing speech recognition model parameters for a plurality of input vector dimensions, comprising:

multiplying a speech model parameter for an input vector dimension by a first scaling factor to produce a product, subtracting an offset from the product to produce a result and multiplying the result by a second scaling factor to produce a linearly-scaled model parameter wherein a different first scaling factor and second scaling factor are used for each input vector dimension and wherein a product of the first scaling factor and the second scaling factor is the same for all input vector dimensions;

applying the linearly-scaled model parameter to a non-linear scaling function to produce a scaled model parameter;

quantizing the scaled model parameter to form a first quantized speech recognition model parameter for the input vector dimension;

multiplying a second model parameter for the input vector dimension by the second scaling factor to produce a second product and quantizing the second product to form a second quantized speech recognition model parameter for the dimension; and storing the quantized speech recognition model parameters in memory.

2. The method of claim 1 wherein applying the linearly-scaled model parameter to a non-linear scaling function comprises applying the linearly-scaled model parameter to a non-linear function that includes a square root operation.

3. The method of claim 1 further comprising quantizing a plurality of model parameters to form a plurality of quantized model parameters.

4. The method of claim 3 wherein the plurality of model parameters comprise a separate model parameter for each dimension of a vector.

5. The method of claim 4 further comprising using the plurality of quantized model parameters to determine a likelihood of an input vector.

6. The method of claim 5 wherein using the plurality of quantized model parameters comprises determining a sum using the quantized model parameters and multiplying the sum by the inverse of the square of the product of the scaling factor and the second scaling factor.

7. The method of claim 5 further comprising quantizing a value for each dimension of the input vector to produce a plurality of quantized input values.

8. The method of claim 7 wherein quantizing a value for a dimension of the input vector comprises multiplying the value for the dimension by the first scaling factor and subtracting the offset to form a scaled dimension input value and quantizing the scaled dimension input value.

9. The method of claim 5 further comprising using the plurality of quantized model parameters to determine a separate likelihood for each of a plurality of input vectors.

10. The method of claim 9 wherein using the plurality of quantized model parameters to determine a separate likelihood for each of a plurality of input vectors comprises determining the likelihoods for a plurality of input vectors for each retrieval of the quantized model parameters from a memory location.

11. A computer-readable storage medium having computer-executable instructions for performing steps comprising:
generating a first model parameter and a second model parameter for each dimension of an input feature vector based on training data;
for the first model parameter for each dimension, linearly scaling the first model parameter by multiplying the first model parameter by a first dimension scaling factor to form a product subtracting an offset from the product to form a result and multiplying the result by a second dimension scaling factor to form a linearly-scaled value, wherein the first dimension scaling factor and the second dimension scaling factor are different for at least two dimensions and the product of the first dimension scaling factor and the second dimension scaling factor are the same for all dimensions;
scaling the linearly-scaled value using a non-linear function to produce a scaled speech recognition model parameter;
for the second model parameter for each dimension, multiplying the second model parameter by the second dimension scaling factor to produce a second scaled speech recognition model parameter;
quantizing the scaled speech recognition model parameter and the second scaled speech recognition model parameter for each dimension to form quantized speech recognition model parameters; and
storing the quantized speech recognition model parameters for later use in a speech recognition.

12. The computer-readable storage medium of claim 11 wherein the non-linear function comprises a square root operation.

13. The computer-readable storage medium of claim 11 further comprising performing a step of using the quantized speech recognition model parameters to determine a likelihood of an input value representing a portion of a speech signal.

14. The computer-readable storage medium of claim 13 further comprising scaling the input value to produce a scaled input value and using the scaled input value and the quantized model parameters to determine a likelihood.

15. The computer-readable storage medium of claim 14 wherein scaling the input value comprises multiplying the input value by a scaling factor to form an input product and subtracting an offset from the input product.

16. The computer-readable storage medium of claim 15 wherein the input value is a value for a dimension of an input feature vector and wherein the likelihood is a likelihood of the input feature vector.

17. The computer-readable storage medium of claim 13 further comprising using the quantized model parameters to determine a separate likelihood for each of a plurality of input values representing separate frames of a speech signal.

18. The computer-readable storage medium of claim 17 wherein determining a separate likelihood for each of a plurality of input values comprises retrieving the quantized model parameter from memory to form a retrieved model parameter and using the retrieved model parameter to determine a separate likelihood for each of the plurality of input values.

19. A method of determining a separate likelihood for each of a plurality of input vectors, the method comprising:
retrieving a set of quantized model parameters for a state and a vector dimension;
determining a respective first term of a respective likelihood for the state for each of at least two input vectors representing at least two frames of a speech signal based on the retrieved set of quantized model parameters;
after determining the respective first terms, retrieving a second set of quantized model parameters for the state and a second vector dimension;
determining a respective second term of the respective likelihood for the state for each of the at least two input vectors based on the retrieved second set of quantized model parameters;
determining a respective likelihood for the state for each input vector using the respective first term and respective second term; and
using the likelihood for the state for each input vector to recognize words from the speech signal.

20. The method of claim 19 wherein the quantized model parameters are quantized in part by using a non-linear scaling function.

21. The method of claim 20 wherein the non-linear scaling function causes different quantized model parameters to have different maximum quantization errors.

22. The method of claim 21 wherein a majority of the quantized model parameters has a smaller maximum quantization error than the remainder of the quantized model parameters.

23. The method of claim 19 wherein the at least two input vectors comprises four input vectors.

24. The method of claim 23 further comprising using the respective likelihoods for the state to prune at least one state from a set of possible states.

* * * * *